No. 792,896. PATENTED JUNE 20, 1905.
J. HILEMAN.
NUT LOCK.
APPLICATION FILED MAY 12, 1905.

Witnesses
L. O. Langworthy

Inventor
Jonas Hileman
By Watson E. Coleman
Attorney

No. 792,896. Patented June 20, 1905.

UNITED STATES PATENT OFFICE.

JONAS HILEMAN, OF SALTSBURG, PENNSYLVANIA.

NUT-LOCK.

SPECIFICATION forming part of Letters Patent No. 792,896, dated June 20, 1905.

Application filed May 12, 1905. Serial No. 260,137.

*To all whom it may concern:*

Be it known that I, JONAS HILEMAN, a citizen of the United States, residing at Saltsburg, in the county of Indiana and State of Pennsylvania, have invented certain new and useful Improvements in Nut-Locks, of which the following is a specification, reference being had therein to the accompanying drawings.

My invention relates to nut-locks, and more particularly to that class wherein a washer having teeth or serrations is employed in connection with a flexible spring secured to a nut capable of free rotation upon its bolt in one direction, but normally locked against rotation in the opposite direction by means of said spring and washer.

A further object of the invention is to provide a nut-lock that shall be simple and inexpensive in construction, durable, and effective in operation.

Other objects and advantages of my invention, as well as the structural features by means of which these objects are attained, will be made clear by an examination of the specification, taken in connection with the accompanying drawings, in which the same reference-numerals indicate corresponding portions throughout, and in which—

Figure 1:
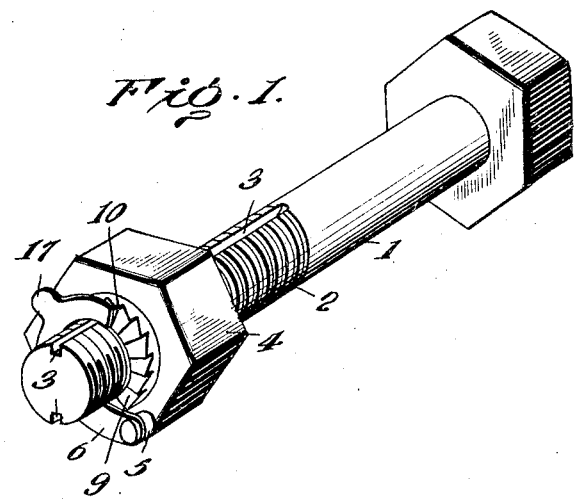
Figure 2:
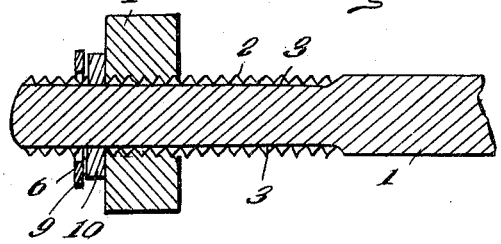
Figure 3:
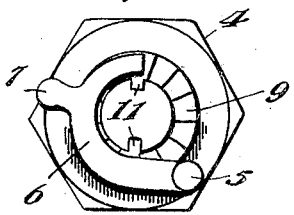
Figure 4:
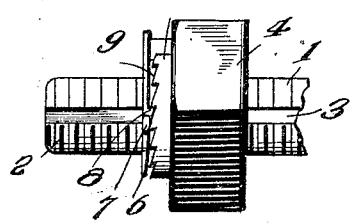
Figure 5:
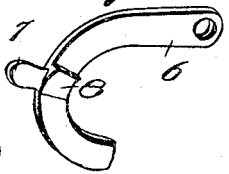
Figure 6:
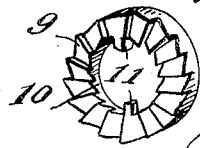

Figure 1 is a perspective view of a threaded bolt with a nut thereon and showing my device in operative position. Fig. 2 is a sectional view taken longitudinally of the bolt. Fig. 3 is an end view. Fig. 4 is a side view. Fig. 5 is a perspective detail of the spring, and Fig. 6 is a perspective view of the serrated washer.

1 designates a bolt provided with threads 2 and longitudinal grooves 3.

4 represents a nut provided with interior threads adapted to engage with the threads 2 on the bolt and bearing a projecting lug 5, on which is rigidly mounted a leaf-spring or pawl 6, provided with a thumb-piece 7, and a point or lug 8, adapted to engage with the teeth or serrations 9 on one side of a ring or washer 10, which is provided with lugs or projections 11, projecting into the grooves 3 in the bolt.

In operation the nut is secured on the bolt in the usual manner until the outer end of the bolt is even with the outer edge of the nut. The washer 10 is then slipped in between the nut and the leaf-spring 6 and turned until the lugs or projections 11 register with the longitudinal grooves 3, whereupon the nut is screwed farther on the bolt and the washer is carried therewith longitudinally of the bolt by means of the leaf-spring 6. As soon as the washer is sufficiently far on the bolt to prevent its rotating by reason of said projections 11 traveling in the grooves 3 the point or projection 8 on the leaf-spring corresponding in contour to the serrations 9 slides along over the same when the nut is being screwed on the bolt; but when it is attempted to turn the nut in the opposite direction to unscrew it the vertical side of the point or projection 8 engages with the vertical sides of the teeth 9, and the spring is thereby rigidly held, thus preventing the nut from unscrewing.

When it is desired to remove the nut from the bolt, the point 8 is released from engagement with the teeth or serrations 9 by means of the thumb-piece 7, whereby force may be exerted against the tension of the spring 6 and the nut released.

Having thus described my said invention, what I claim as new, and desire to secure by Letters Patent of the United States, is—

1. In a nut-lock, the combination, with a threaded bolt having longitudinal grooves therein, and an interiorly-threaded nut, of a leaf-spring borne by the nut, a lateral point or projection carried by the spring, an annular washer arranged between the leaf-spring and the nut and having serrations on one of its sides adapted to be engaged by the lateral point or projection, lugs depending from the interior of the washer and engaging with the grooves to hold the washer against rotation, and a thumb-piece formed integral with the spring whereby force may be exerted against its tension to release the point or projection against engagement with the serrations.

2. In a nut-lock, the combination, with a threaded bolt having longitudinal grooves therein, and an interiorly-threaded nut, of a leaf-spring borne by the nut, a lateral point or projection carried by the spring, an annular washer arranged between the leaf-spring and the nut and having serrations on one of its sides adapted to be engaged by the lateral point or projection, and lugs depending from the interior of the washer and engaging with the grooves to hold the washer against rotation.

In testimony whereof I hereunto affix my signature in presence of two witnesses.

JONAS HILEMAN.

Witnesses:
EDWARD FRANKLIN,
J. G. JOHNSTON.